United States Patent
Kikuchi et al.

(10) Patent No.: US 11,429,676 B2
(45) Date of Patent: Aug. 30, 2022

(54) DOCUMENT FLAGGING BASED ON MULTI-GENERATIONAL COMPLEMENTAL SECONDARY DATA

(71) Applicant: International Business Machines Corporation, Armonk, NY (US)

(72) Inventors: Hiroaki Kikuchi, Yokohama (JP); Yuichi Suzuki, Tokyo (JP); Takashi Fukuda, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 440 days.

(21) Appl. No.: 16/657,180

(22) Filed: Oct. 18, 2019

(65) Prior Publication Data

US 2021/0117483 A1  Apr. 22, 2021

(51) Int. Cl.
*G06F 16/93* (2019.01)
*G06F 16/23* (2019.01)
*G06F 12/02* (2006.01)
*G06F 7/14* (2006.01)

(52) U.S. Cl.
CPC ............... *G06F 16/93* (2019.01); *G06F 7/14* (2013.01); *G06F 12/0253* (2013.01); *G06F 16/2379* (2019.01); *G06F 2212/1044* (2013.01)

(58) Field of Classification Search
CPC .... G06F 16/93; G06F 16/2379; G06F 16/954; G06F 7/32; G06F 7/14; G06F 12/0253; G06F 2212/1044

See application file for complete search history.

(56) References Cited

U.S. PATENT DOCUMENTS

| | | | |
|---|---|---|---|
| 7,958,091 B2* | 6/2011 | Nair | G06F 16/2379 718/101 |
| 9,098,603 B2 | 8/2015 | Hornkvist | |
| 9,779,358 B2* | 10/2017 | Le Gonidec | G06N 7/02 |
| 2003/0229470 A1* | 12/2003 | Pejic | G06Q 10/10 702/179 |
| 2006/0253423 A1* | 11/2006 | McLane | G06F 16/951 |
| 2010/0281013 A1 | 11/2010 | Graefe | |
| 2011/0029504 A1* | 2/2011 | King | G06F 16/93 707/E17.083 |
| 2012/0271852 A1* | 10/2012 | Fredricksen | G06F 16/9574 707/782 |
| 2013/0097168 A1* | 4/2013 | Chang | G06F 16/353 707/737 |
| 2017/0011082 A1 | 1/2017 | Velury | |

FOREIGN PATENT DOCUMENTS

CN          104361009 B      10/2017

* cited by examiner

*Primary Examiner* — Etienne P Leroux
(74) *Attorney, Agent, or Firm* — Jeffrey S LaBaw; David Mattheis; Feb R Cabrasacun (57) ABSTRACT

A first user request which specifies a target document set wherein a first subset of the documents is flagged by a user. A primary flag table is created for the target document set. A first document subset is created matching the first user request. It is determined whether a number of flagged documents exceeds a first threshold. If so, a secondary flag table is created for the first document subset and flag data corresponding to the first document subset is stored in the secondary flag table. The flag data in the secondary flag table is merged into the primary flag table.

20 Claims, 7 Drawing Sheets

DOCUMENT FLAGGING BASED ON MULTI-GENERATIONAL COMPLEMENTAL SECONDARY DATA

BACKGROUND OF THE INVENTION

This disclosure relates to document flagging. More particularly, it relates to document flagging in a search environment with large numbers of documents.

Search engines are well-known applications for Internet research. Search-engine-based data mining tools are also well-known. In such a data mining tool, at times the user would like to extract knowledge from large numbers of documents returned from a search query. Document flagging is one feature that is available for a user to mark the interesting documents from the returned search set. The flagged documents are used for a variety of purposes including sharing with other users or using the flagged document set in additional document processing applications including natural language processing (NLP) or machine learning.

In some data mining tools, a user can set (or unset) a flag to not only a single document but also to the entire document set resulting from a search engine query. It is challenging to update a huge number of documents quickly with the correct flags. However, in a collaboration type environment when multiple users are working with a set of documents or multiple sets of documents, the need to reflect flagging information in a real-time manner is important. The scalability required in a document markup function for near-real-time collaborative content mining for massive document corpus (e.g., 100 million documents) is very difficult.

Further improvements in document flagging technology are needed.

BRIEF SUMMARY

According to this disclosure, a method, apparatus and computer program product for searching for document flagging. A first user request which specifies a target document set wherein a first subset of the documents is flagged by a user. A primary flag table is created for the target document set. A first document subset is created matching the first user request. It is determined whether the number of flagged documents exceeds a first threshold. If so, a secondary flag table is created for the first document subset and flag data corresponding to the first document subset is stored in the secondary flag table. The flag data in the secondary flag table is merged into the primary flag table.

The foregoing has outlined some of the more pertinent features of the disclosed subject matter. These features should be construed to be merely illustrative. Many other beneficial results can be attained by applying the disclosed subject matter in a different manner or by modifying the invention as will be described.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION OF AN ILLUSTRATIVE EMBODIMENT

At a high level, the invention provides a method, system and computer program product for document flagging, particularly in environments in which large numbers of documents need to be flagged in near real-time. Embodiments of the invention create a secondary flag table or complementary secondary flag table to hold flag data for a particular "generation" of document flag data. A generation of flag data is associated with a particular document flagging operation. The secondary flag tables are stored until they can be merged with a set of primary flag data. In embodiments, this is performed when there is a threshold amount of flag data in the secondary flag tables. In embodiments of the invention, when the number of flagged documents crosses a threshold, e.g., more than half of a total number of documents in a returned search, a complementary or complemental secondary flag table is created to store an inverse of the flag data for the generation of flag data. When the secondary data is merged, in embodiments, both flag data from regular and complementary secondary flag tables are merged with the primary flag data table.

The embodiments which will now be described more fully herein with reference to the accompanying drawings are exemplary. The invention may, however, be embodied in many different forms and should not be construed as limited to the example embodiments set forth herein. The embodiments are provided so that this disclosure conveys the principles of the invention; variations on these examples are within the scope of the invention as will be understood by those skilled in the art. In the description, details of well-known features and techniques may be omitted to avoid unnecessarily obscuring the presented embodiments.

Figure 1:
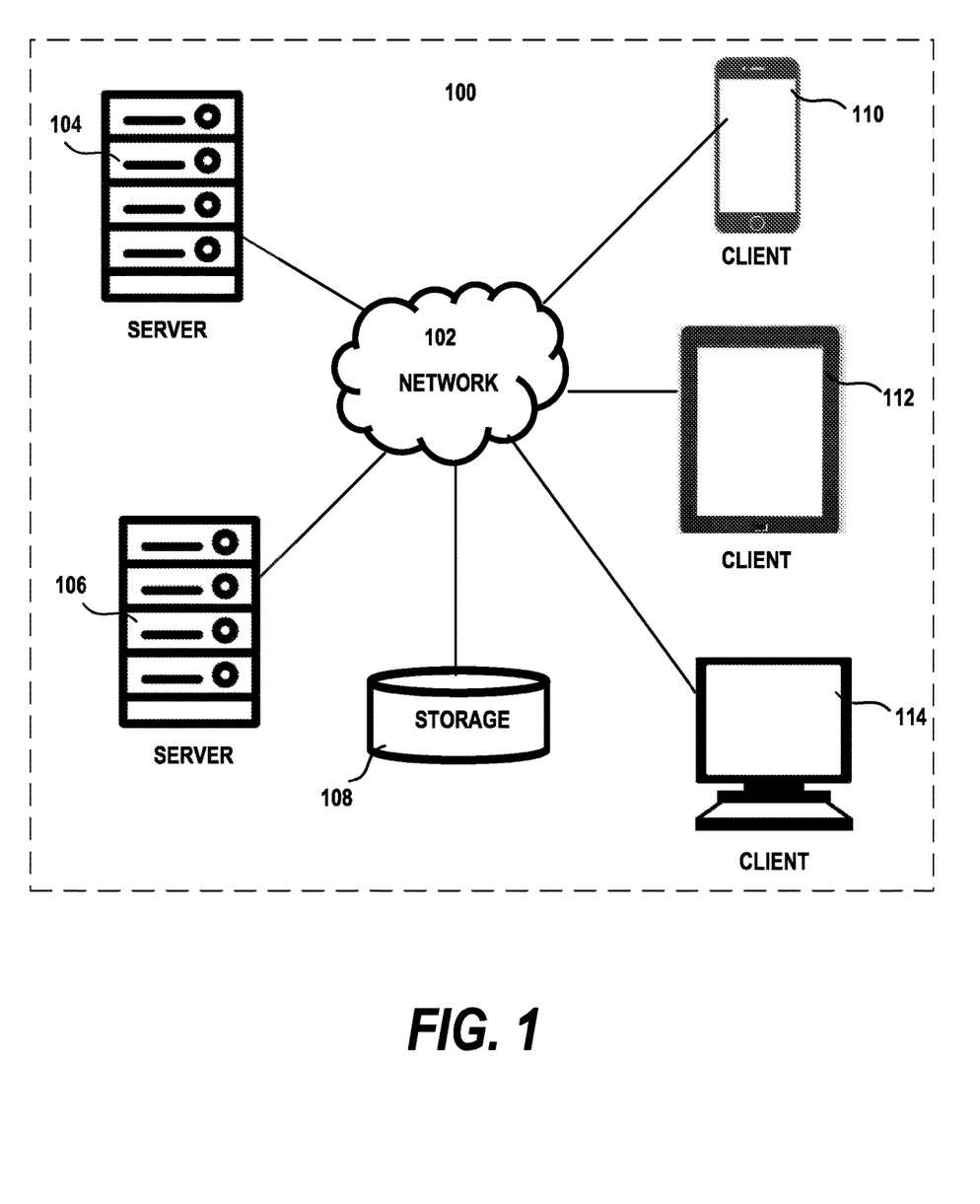
FIG. 1 depicts an exemplary block diagram of a distributed data processing environment in which exemplary aspects of the illustrative embodiments may be implemented.
Figure 2:
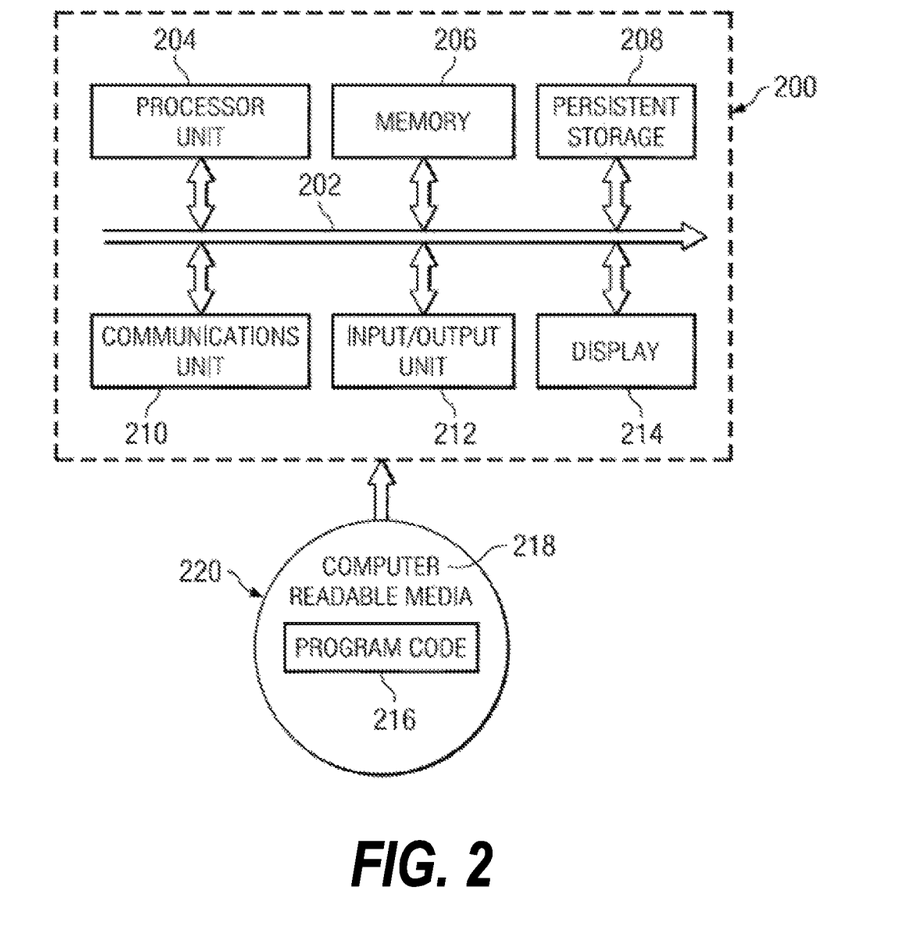
FIG. 2 is an exemplary block diagram of a data processing system in which exemplary aspects of the illustrative embodiments may be implemented.

With reference now to the drawings and in particular with reference to FIGS. 1-2, exemplary diagrams of data processing environments are provided in which illustrative embodiments of the disclosure may be implemented. It should be appreciated that FIGS. 1-2 are only exemplary and are not intended to assert or imply any limitation with regard to the environments in which aspects or embodiments of the disclosed subject matter may be implemented. Many modifications to the depicted environments may be made without departing from the spirit and scope of the present invention.

With reference now to the drawings, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with network storage unit 108. In addition, clients 110, 112, and 114 are also connected to network 102. These clients 110, 112, and 114 may be, for example, smartphones, tablet computers, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown. One or more of the server computers may be a mainframe computer connected to network 102. Mainframe computer can be, for example, an IBM System z mainframe running the IBM z/OS operating system. Connected to the mainframe may be mainframe storage unit and workstations (not pictured). The workstations can be either a personal computer connected directly to the mainframe communicating over a bus, or a console terminal connected directly to the mainframe via a display port.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as client 114 in FIG. 1, in which computer usable code or instructions implementing the processes for illustrative embodiments of the disclosure may be located.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit(s) 212 and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor (SMP) system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Further, input/output unit may provide connections to a microphone for audio input from a user and a speaker to provide audio output from the computer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 12 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the present invention may be written in any combination of one or more programming languages, including an object-oriented programming language such as Java™, Smalltalk, C++, C #, Objective-C, or the like, and conventional procedural programming languages such as Python or C. The program code may execute entirely on the user's computer, partly on the user's computer, as a standalone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the disclosed subject matter.

The techniques described herein may operate in conjunction within the standard client-server paradigm such as illustrated in FIG. 1 in which client machines communicate with an Internet-accessible Web-based portal executing on a set of one or more machines. End users operate Internet-connectable devices (e.g., desktop computers, notebook computers, Internet-enabled mobile devices, or the like) that are capable of accessing and interacting with the portal. Typically, each client or server machine is a data processing system such as illustrated in FIG. 2 comprising hardware and software, and these entities communicate with one another over a network, such as the Internet, an intranet, an extranet, a private network, or any other communications medium or link. A data processing system typically includes one or more processors, an operating system, one or more applications, and one or more utilities.

Embodiments of the present invention provide document flagging for a document markup function. They can be used for near-real-time collaborative content mining for a plurality of users. In a document flagging operation, example flags include document importance, e.g., high, mid, low, and workflow phases, e.g., inbox, process, review. In a typical document flagging operation, the system browses the flags which are set on members of a document set to count up the number of flagged documents in the document set and to check to what flag is assigned to a document. Next, the system assigns flags to a document set. That is, the system determines which members of the overall document set share the same set of flags.

In a collaborative content mining application, individual collaborators assign flags manually, e.g., by clicking documents, or in a bulk way by a condition, e.g., issuing a query and indicating that all documents share the same flags. Problems occur with the need to reflect document flagging information in a real time manner for collaboration with a huge document corpus or many documents returned from a search operation. It is becoming common for a document corpus to comprise millions of documents.

Figure 3:
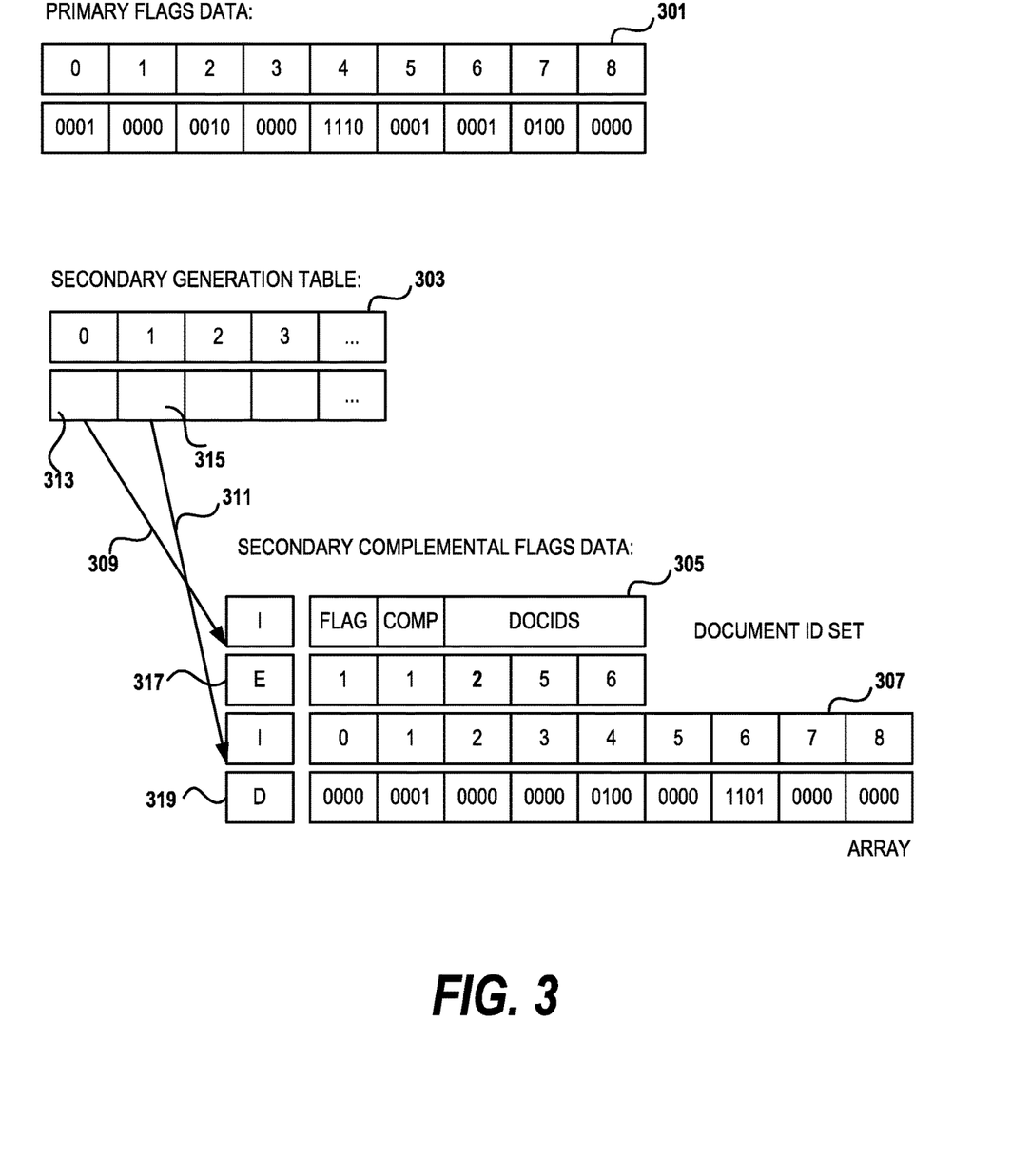
FIG. 3 depicts a primary flag table, a secondary data table and a secondary complemental flag data table.

Referring to FIG. 3, an on-memory array or table 301 is created which represents the relationships between documents and flags. In the drawing, 4-bits data are allocated per document. The primary flag table 301 contains flag data for nine documents. In a near-real-time manner, when the user chooses to flag documents in a manual or bulk process, the document to flag relations are synchronized in the primary flag table 301 to reflect per-document flag data. A bit set implementation, synchronizing flags to documents is an alternative. The alternative has an advantage in memory efficiency especially in cases where relatively few documents have flags. The alternative has a disadvantage in that it is complex and expensive to align with static data (a whole document ID set update as compared to a document ID level atomic update.)

In embodiments of the invention, there is a secondary generation table which keeps track of the secondary flag tables generated by flag data for different sets of documents. Also illustrated are two types of secondary flag tables, a complementary secondary flag table 305 and a secondary flag table 307. The secondary flag table 307 should be used if the number of flags to update is small since it is more efficient in the view of memory usage. However, if the number of flags to update becomes large and passes a threshold, the complementary secondary flag table 305 is preferably used. In one embodiment, a single instance of a complementary flag table 305 or a secondary table 307 stores the updates for single flag. In this embodiment, it is required to create ten records if a user request update requires ten types of flag in a "generation" of documents. Other embodiments of the secondary flag tables store more than one type of flag.

In the exemplary index of the document array, each group of four bits corresponds to a document ID; each bit corresponds to a flag. As an example, in the first four bits, i.e. the 0th data is 0001 so Flag #0 is enabled for document 0. In the next four bits, i.e. the $1^{st}$ data is 0101, Flag #0 and #2 are enabled for document 1. In this example, 4 flags can be associated with a document to simplify an explanation, however, in the document array a longer array, e.g., a Java™ long array, i.e. 64 flags are used.

However, using a solution with only a primary flag table in a simple scale-out for a partitioned distributed indexing process when flagging documents in response to a search query having a huge number of returned documents has severe performance problems. Theoretically, the performance problems can be solved by scaling out the partitioning data by running multiple threads in parallel. But this is too expensive from a computation resource standpoint. Even for a single operation, the required CPU resource is high. For example, with four threads for four partitions and twenty concurrent users requires 80 CPUs.

Therefore, a new indexing solution was devised. With the present invention, the total computational cost will be reduced by half when comparing the worst case for each of the methods. For the complemental update strategy used in the invention, the worst case happens when half of the documents are updated. If number of documents are greater than half, a primary flag table only solution increases in computational cost as the number of flags increases. However, in the present invention, computational cost will decrease after peaking at half of the total number of documents.

FIG. 3 depicts a primary flag table, a secondary generation table, a secondary data table and a secondary complemental flag data table. The current method is based on document flagging based on multiple generations of secondary flag data stored in secondary flag tables and secondary complemental flag tables. Using the primary flag table 301, a secondary generation table 303, the complemental secondary flag data table 305 and the secondary flag data table 305, the system can reduce the computation power needed for storing and accessing document flag data when a large document set is updated.

In embodiments of the method, if the number of documents flagged is below a threshold, a secondary data table 307 is constructed and when the number of documents is above the threshold, a complemental secondary data table 305 is constructed. In some embodiments of the invention, there is another smaller threshold below which the primary flag data table is updated without creating a secondary table. If user's flagging request is for a very small number of documents, e.g., one or two documents, it is better to update the primary flag table 301 directly without creating a secondary flag table. If the number of documents flagged is stored in a secondary flag table 303, the flagged document IDs are stored. When a secondary complemental flag data table 305 is used, flag information data for the complemental document set (the documents which are not updated) is stored.

In the primary flags data table 301, in embodiments, the flag data is periodically synchronized with static data on storage. In preferred embodiments, multiple secondary data tables 307 and multiple secondary complemental flags data tables 305 are created, each for a "generation" of flagged document data.

The information stored in the secondary tables is temporary. The multiple secondary flag tables 303 and secondary complemental flags data tables 305 are periodically merged into the primary flag table 301 when the overall flag data stored in the secondary flag tables exceeds a threshold. In one embodiment, the threshold is a memory consumption limit of the secondary tables 303, 305. In alternative embodiments, a number of documents stored outside the primary flag table 301 data (i.e. in the secondary tables) is used as a threshold. In an embodiment, the multiple secondary data tables 303 and secondary complemental flags data tables 305 are periodically merged into the primary flags data 301 in the order of their generation.

As shown in the drawing, in embodiments of the invention, the primary flags data table 301 is an array with a set of bits for holding flag data information for each document in the corpus. Four bits are shown in the drawing for ease in illustration, however, in an actual implementation a larger set of bits, e.g., 64 bits, would be allocated for the flag data for each document.

The secondary data table 307 comprises a similar array. Among the differences between the primary flag table 301 and the secondary flag table 307 is that the secondary table only stores the document ids which user has requested to update, i.e. flags, instead of all the documents. Although only four bits per document are shown in the fields at the bottom of the secondary table 307 for ease in illustration, however, as mentioned above in the case of the primary flag table, more bits per document are used when needed to indicate the types of flag information which are being requested by the user. In most instances, the number of documents in the secondary table is much lower than in the primary flag table. Although a single secondary flag table 307 and single secondary complemental flag table 305 are shown in the drawing, in embodiments of the invention, multiple secondary flag tables are created, each one for a respective "generation" of flag data. In the terminology of the invention, each time a set of documents is flagged, a new "generation" of secondary flags data is created.

In embodiments of the invention, each secondary data table can have a different implementation. For example, a first secondary data table for a first generation of documents is array based and a second secondary data table for a second generation of documents is document id set based in some embodiments. Other data table implementations are known to the art and used in embodiments of the invention.

When the invention is scaled out to multiple partitions, a set of primary flag data and secondary data tables can be created for each partition. That is, for each partition, a primary flags data table 301, a secondary generation table 303, a set of secondary flag data tables 307 and a set of secondary complemental flags data tables 305 are generated as appropriate for a particular generation of flagged documents. Multiple sets of secondary flag tables are helpful to expedite the synchronization process. By creating a set of secondary tables/secondary complemental flag tables per partition, embodiments of the invention can process updates for different partitions concurrently on separate threads.

Some features of the complemental secondary flags table 305 and the secondary flags data table 307 are now described. In embodiments of the invention, the secondary flags data table 307 is generated when a set of documents which have been assigned flags is greater than a small threshold, but less than a second threshold. In embodiments of the invention, the second threshold is equal to about half of the corpus or the corpus partition. The complemental secondary flag table 305 is used to store flag information for the reversed (i.e. complemental) document set. That is, the complementary or complemental set is the set of documents which are not flagged and is created when the number of flagged documents exceeds the threshold of about half of the corpus. In the drawing, for ease in illustration, the whole corpus (or search result) is 9 documents, though in embodiments of the invention thousands, if not millions of documents are in the corpus or search result. In the illustrated example of a corpus of nine documents, documents 1, 3, 7, 8 and 9 are flagged. Each time a set of documents is flagged, a new "generation" of secondary flags data is created. In the drawing, the secondary flag table 307 is used to manage the flagging information for documents 0, 2, 4, 5, 6. While in preferred embodiments, a threshold of half of the whole corpus triggers saving the size of complemental document set, although in alternative embodiments, the threshold is a dynamic threshold based on whether the secondary table 307 or the complemental secondary table 305 would be the most computationally efficient for storing the flag data, e.g., depending on the complexity of the flag data for the set (generation) of documents.

The secondary generation table 303 is used to track which complemental secondary flag table or secondary flag table is used to store a respective generation of document flag data. As illustrated in the drawing, field 313 stores a pointer 309 for the first generation of documents pointing to the complemental secondary flag table 305. Field 315 stores a pointer 311 for the second generation of documents pointing to the secondary flag table 307.

An indicator is used in embodiments to specify whether the document set stored in a respective secondary flag table or complemental secondary flag table is to enable or disable the flags for respective documents stored in the table. For example, as shown in the drawing, if the reversed mask data indicator 317 is set to "E" (for "Enabled") and complemental secondary flag data does NOT include document 1 for flag 1, document 1 is enabled for flag 0. If the reversed mask data indicator 317 was is to "D", and complemental secondary flag data does NOT include document 1 for flag 1, document 1 is disabled for flag 0. The reverse is true for the secondary flag table. For example, as shown, the data indicator 319 is set to "D" which indicates that the flagged flag data in the table is disabled.

In embodiments of the invention, respective secondary flag tables and/or complemental flag tables are created for each "generation" of documents which are flagged. A "generation" of documents is a document set of documents which are flagged together with the same set of flags in a single operation. Thus, a "first generation" of documents is the result of a first flagging operation, a "second generation" of documents follows the first generation in time and so on. Each generation of documents within a single partition will have its own secondary flag table or complemental secondary flag table.

Periodically, e.g., in a batch manner, the flag data in the secondary flag tables and complemental flag tables are merged into the primary flag table data, preferably in generational order. That is, the secondary flag data of the first generation of documents is first merged into the primary flag data followed by the second generation of documents, and so on.

The duration of blocking for synchronization is minimized by using a Java™ heap garbage collection (GC) in embodiments of the invention. In this embodiment, to make full use of limited memory, the JVM is used to "clean up" the memory periodically, e.g., through garbage collection (GC). While "cleaning" the memory can consume CPU resources, by optimizing the timing of merging secondary data to coincide with the garbage collection cleaning the memory, fewer CPU resources are needed in the overall process while providing a more efficient memory for document flagging.

Figure 4:
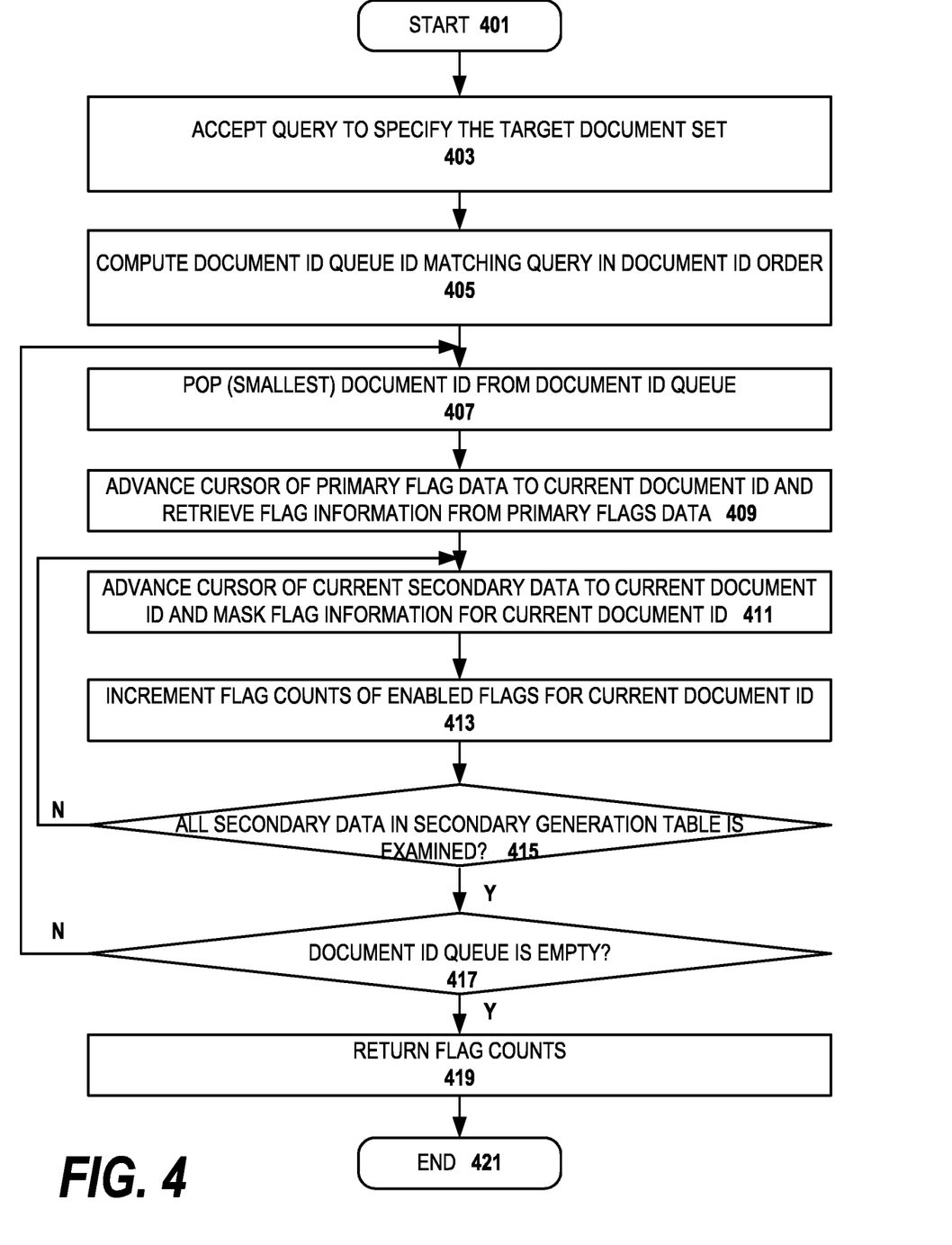
FIG. 4 is a flow diagram for counting flags in a set of documents when flags are set while a user is browsing documents.

FIG. 4 is a flow diagram for counting flags in a set of documents when flags are set while a user is browsing documents. Step 401 is the start of the process when the system detects that the user is browsing for new documents which will become part of the corpus. In step 403, the system accepts a query to specify the target document set. In step 405, the system computes the document id and the queue id for each document which matches the query and assembles the set of documents in document id order.

In step 407, the system "pops" the first document from the queue, that is, the document having the smallest document id from document id queue. In step 409, the system advances the cursor of the primary flag data to the current document id and retrieves the flag information from primary flags data. In step 411, the system advances the cursor of the current secondary flag data to the current document id and mask flag information for the current document id. In step 413, the system increments the flag counts of the enabled flags for the current document id.

In step 415, the system determines whether all the secondary flag data in the secondary flag tables for that generation of documents has been examined. If not, the system returns to step 411. In step 417, the system determines whether the document id queue is empty, i.e. all the documents have been processed. If not, the system returns to step 407 for the next document in the document queue. Next, in step 419, having completed processing all of the documents, the system returns the flag counts for the current document set. One or more flags may appear in current document set(=flag count). An alternate way to think of this process is that it determines which flag(s) are correlated to or associated with current document set. In step 421, the process ends.

Figure 5:
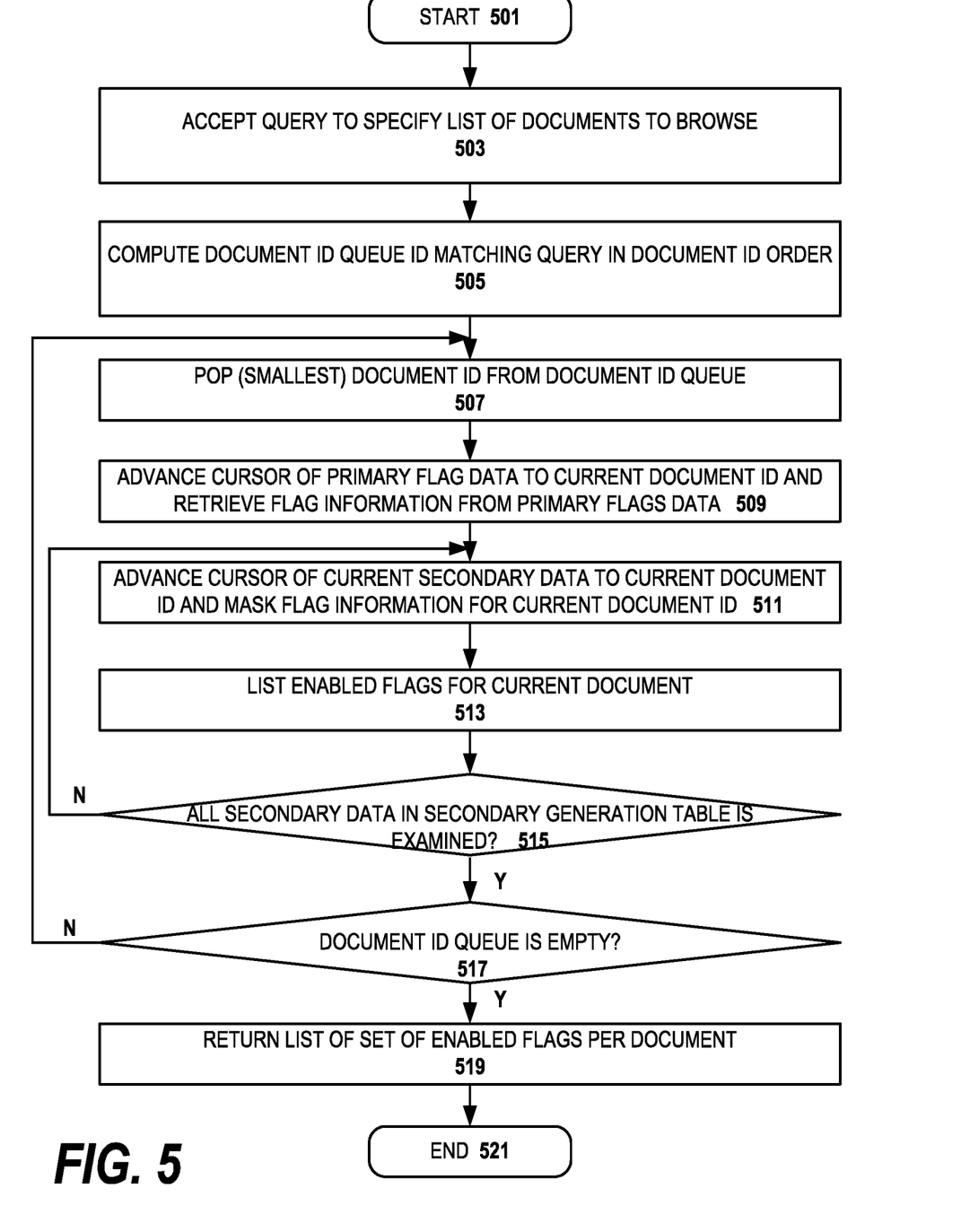
FIG. 5 is a flow diagram for browsing flags in a set of documents when flags are set while a user is browsing documents.

FIG. 5 is a flow diagram for browsing flags in a set of documents when flags are set while a user is browsing documents. The system starts the process in step 501. In step 503, the system accepts a query to specify a set of documents to browse. In step 505, the system computes the document id and queue id for each of the documents matching the query in document id order.

In step 507, the system pops the first document id from the document id queue. In step 509, the system advances the cursor of the primary flag data to the current document id and retrieves the flag information from the primary flag table. In step 511, the system advances the cursor of the current secondary data to the current document id and the mask flag information for the current document id.

In step 513, the system lists the enabled flags for the current document. In step 515, the system determines whether all secondary data in secondary generation table has been examined. If not, the system returns to step 511. In step 517, the system determines whether the document id queue is empty. If not, the system returns to step 507.

In step 519, the system returns a list of the set of enabled flags per each document. In step 521, the process ends.

Figure 6:
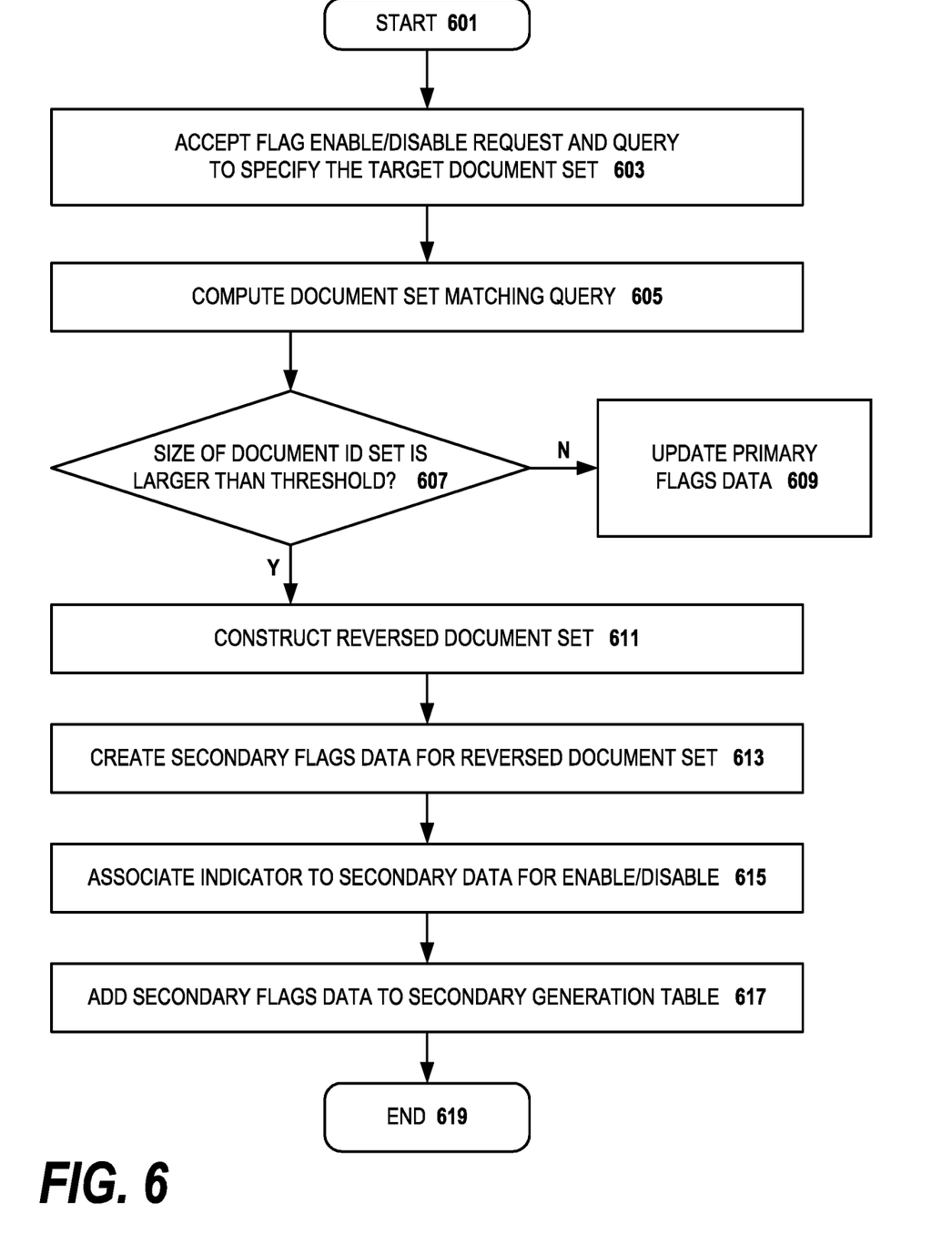
FIG. 6 is a flow diagram for assigning flags to a document set in one embodiment of the invention.

FIG. 6 is a flow diagram for assigning flags to a document set in one embodiment of the invention.

In step 601, the system starts the process. In step 603, the system accepts the flag enable or disable request and the query to specify the target document set. In step 605, the system computes the document set which matches the query.

In step 607, the system determines whether the size of the document set is larger than threshold. As is mentioned above, in preferred embodiments, the threshold is set to half the number of documents in the corpus in some embodiments. If not, in step 609, the system updates the primary flags data in the primary flag table.

If the size of the document set is larger than the threshold, in step 611, the system constructs a complementary document set. In step 613, the system creates a secondary flag table for the complementary document set. In step 615, the system associates an indicator to the secondary data to indicate whether the flags are enabled or disabled. In step 617, the system adds the secondary flags data to the secondary generation table.

Figure 7:
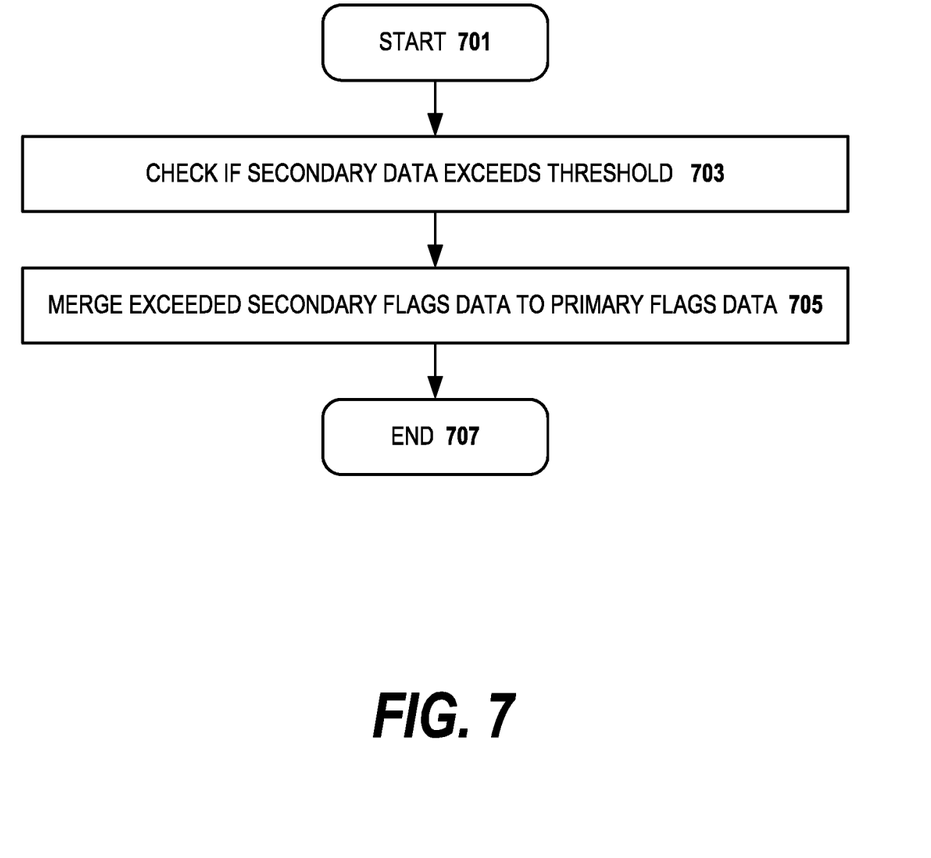
FIG. 7 is a flow diagram for merging secondary flag data to primary flag data in one embodiment of the invention.

FIG. 7 is a flow diagram for merging secondary flag data to primary flag data in one embodiment of the invention. In embodiments of the invention, this process is performed in a separate thread.

In step 701, the system starts the thread for this process. In step 703, the system checks if secondary flag data exceeds a threshold. As mentioned earlier, examples of a threshold include a total memory consumption limit of the secondary tables or a number of documents stored outside the primary flag table. If the threshold is exceeded in step 705, the system merges the secondary flags data to the primary flags data. In one embodiment of the merge process, the merge of secondary flag generation table(s) and the complementary secondary flag generation tables into the primary flag table is iterated from the start to the end to update the primary flag table. In an embodiment, each generation of secondary tables has either a docid set style or a matrix style. If a docid set style table is used in the secondary flag generation table, the process updates the documents having an ID which is included in the secondary table array. If indicator is E, the flag bit in the primary flag table will be set to 1 and if the indicator is set to D, the primary flag bit is set to 0. When a complementary secondary flag table is used, the merge process updates the documents having an ID which is not included in the complementary secondary flag table array as the complementary flag table is used to store the documents whose flags are not set by the user. If a table style is used by the generation secondary table and the indicator is E, the merge process sets the documents to 1 for all the bits in the primary flag table where bit is 1 on the secondary record. If indicator is D (Disabled), the merge process sets the documents to 0 for all the bits on the primary flag table where bits are set to 1 in the secondary flag table record.

In step 707, the system ends the process. Periodically, the system runs the process to determine whether the secondary flag data should be merged with the primary flags data. In alternative embodiments, this process runs continually in the background.

Embodiments of the invention display a graphical user interface representing the document data which may be flagged by the user. The user interface would have controls which allow the users to apply flags to selected documents within the corpus or all the documents in a corpus. When a document is flagged, the user assigns flags to one or more documents in the document set for purposes of classification, export or additional analysis purposes. By flagging a document, the user creates a document subset for the additional operations. In embodiments of the invention, custom flags may be added to a standard or default set of flags by the user or administrator. For example, a custom "Quality Assurance" flag indicates documents that may indicate a quality assurance problem. As mentioned above, collaborative document handling applications such as IBM Watson Content Analysis can use embodiments of the invention. Another control in the user interface would allow the user to see which documents are associated with a particular flag, e.g., the custom quality assurance flag.

The order of steps in which the method is described is not intended to be construed as a limitation, and any number of the described method blocks may be combined in any order to implement the method, or an alternate method. Additionally, individual blocks may be deleted from the method without departing from the spirit and scope of the embodiments of the invention.

One skilled in the art will understand that the division of tasks between the modules is exemplary, and that other embodiments of the invention will divide the tasks differently. Further, in describing exemplary processes below, the order in which the processes are described with reference to the flow diagrams is not intended to be construed as a limitation, and any number of the described method blocks may be combined in a different order to implement the method, or alternate method. Additionally, individual blocks may be deleted from the method without departing from the spirit and scope of the subject matter described herein.

While a preferred operating environment and use case has been described, the techniques herein may be used in any other operating environment in which it is desired to deploy services.

As has been described, the functionality described above may be implemented as a standalone approach, e.g., one or more software-based functions executed by one or more hardware processors, or it may be available as a managed service (including as a web service via a SOAP/XML, or RESTful interface). The particular hardware and software implementation details described herein are merely for illustrative purposes are not meant to limit the scope of the described subject matter.

More generally, computing devices within the context of the disclosed subject matter are each a data processing system comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF).

In addition to the cloud-based environment, the techniques described herein may be implemented in or in conjunction with various server-side architectures including simple n-tier architectures, web portals, federated systems, and the like.

Still more generally, the subject matter described herein can take the form of an entirely hardware embodiment, an entirely software embodiment or an embodiment containing both hardware and software elements. In a preferred embodiment, the module functions are implemented in software, which includes but is not limited to firmware, resident software, microcode, and the like. Furthermore, the interfaces and functionality can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. The computer-readable medium is a tangible, non-transitory item.

The computer program product may be a product having program instructions (or program code) to implement one or more of the described functions. Those instructions or code may be stored in a computer readable storage medium in a data processing system after being downloaded over a network from a remote data processing system. Or, those instructions or code may be stored in a computer readable storage medium in a server data processing system and adapted to be downloaded over a network to a remote data processing system for use in a computer readable storage medium within the remote system.

In a representative embodiment, the techniques are implemented in a special purpose computing platform, preferably in software executed by one or more processors. The software is maintained in one or more data stores or memories associated with the one or more processors, and the software may be implemented as one or more computer programs. Collectively, this special-purpose hardware and software comprises the functionality described above.

In the preferred embodiment, the functionality provided herein is implemented as an adjunct or extension to an existing cloud compute deployment management solution.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

Having described our invention, what we now claim is as follows:

1. A computer implemented method for document flagging comprising:
    accepting a first user request to specify a target document set wherein a first subset of the documents is flagged by a user;
    creating a primary flag table for the target document set;
    creating a first document subset matching the first user request from the target document set;
    determining whether a number of flagged documents in the first document subset exceeds a first threshold;
    responsive to exceeding the first threshold, creating a second document subset for the first user request, wherein the second document set is a complemental document set containing the documents in the target document set which are not flagged in the second user request;
    creating a complemental secondary flag table for the second document subset and storing flag data corresponding to the second document subset in the complemental secondary flag table; and
    merging the flag data in the complemental secondary flag table into the primary flag table.

2. The method as recited in claim 1, further comprising:
    accepting a second user request wherein a second subset of the documents are flagged by the user;
    determining whether a number of flagged documents in the second subset exceeds a second threshold, the second threshold being lower than the first threshold;
    creating a third document subset for the second user request, wherein the third document set is a document set containing the documents in the target document set which are flagged in the second user request; and
    responsive to exceeding the second threshold, creating a secondary flag table for the third document subset and storing flag data for the third document subset in the secondary flag table.

3. The method as recited in claim 2, further comprising;
    accepting a third user request wherein a fourth subset of the documents are flagged by the user; and
    responsive to a number of flagged documents not exceeding the second threshold, updating flag data in the primary flag table for flag data corresponding to the fourth document subset.

4. The method as recited in claim 2, wherein flag data from secondary flag tables and complemental secondary flag tables are periodically merged into the primary flag table, wherein an order that the flag data from the secondary flag tables and complemental secondary flag tables is merged is based on order of creation of the secondary flag tables and complemental secondary flag tables.

5. The method as recited in claim 4, wherein the merging of the flag data from the secondary flag tables and complemental secondary flag tables is triggered when an amount of flag data in the secondary flag tables and complemental secondary flag tables is larger than a third threshold.

6. The method as recited in claim 4, wherein the merging of the flag data from the secondary flag tables and complemental secondary flag tables is coordinated to occur concurrently with a garbage collection operation.

7. The method as recited in claim 5, wherein the third threshold is a cumulative number of documents in secondary flag tables and complemental secondary flag tables.

8. The method as recited in claim 1, wherein an indicator is set to specify whether said set is to enable or disable.

9. Apparatus, comprising:
    a processor;
    computer memory holding computer program instructions executed by the processor for document flagging, the computer program instructions comprising:
    program code, operative to accept a first user request to specify a target document set wherein a first subset of the documents is flagged by a user;
    program code, operative to create a primary flag table for the target document set;
    program code, operative to create a first document subset matching the first user request from the target document set;
    program code, operative to determine whether a number of flagged documents in the first document subset exceeds a first threshold;
    program code, responsive to exceeding the first threshold to create a second document subset for the first user request, wherein the second document set is a complemental document set containing the documents in the target document set which are not flagged in the second user request;

program code, operative to create a complemental secondary flag table for the second document subset and storing flag data corresponding to the second document subset in the complemental secondary flag table; and program code, operative to merge the flag data in the complemental secondary flag table into the primary flag table.

10. The apparatus as recited in claim 9, further comprising:

program code, operative to accept a second user request wherein a second subset of the documents are flagged by the user;

program code, operative to determine whether a number of flagged documents in the second subset exceeds a second threshold, the second threshold being lower than the first threshold;

program code, operative to create a third document subset for the second user request, wherein the third document set is a document set containing the documents in the target document set which are flagged in the second user request; and program code responsive to exceeding the second threshold operative to create a secondary flag table for the second document subset and storing flag data for the third document subset in the secondary flag table.

11. The apparatus as recited in claim 10, further comprising;

program code, operative to accept a third user request wherein a fourth subset of the documents are flagged by the user; and program code responsive to a number of flagged documents not exceeding the second threshold operative to update flag data in the primary flag table for flag data corresponding to the fourth document subset.

12. The apparatus as recited in claim 10, wherein flag data from secondary flag tables and complemental secondary flag tables are periodically merged into the primary flag table, wherein an order that the flag data from the secondary flag tables and complemental secondary flag tables is merged is based on order of creation of the secondary flag tables and complemental secondary flag tables.

13. The apparatus as recited in claim 12, wherein the merging of the flag data from the secondary flag tables and complemental secondary flag tables is triggered when an amount of flag data in the secondary flag tables and complemental secondary flag tables is larger than a third threshold.

14. The apparatus as recited in claim 12, wherein the merging of the flag data from the secondary flag tables and complemental secondary flag tables is coordinated to occur concurrently with a garbage collection operation.

15. A computer program product in a non-transitory computer readable medium for use in a data processing system, the computer program product holding computer program instructions executed by the data processing system for document flagging, the computer program instructions comprising:

program code, operative to accept a first user request to specify a target document set wherein a first subset of the documents is flagged by a user;

program code, operative to create a primary flag table for the target document set;

program code, operative to create a first document subset matching the first user request from the target document set;

program code, operative to determine whether a number of flagged documents in the first document subset exceeds a first threshold;

program code, responsive to exceeding the first threshold to create a second document subset for the first user request, wherein the second document set is a complemental document set containing the documents in the target document set which are not flagged in the second user request;

program code, operative to create a complemental secondary flag table for the second document subset and storing flag data corresponding to the second document subset in the complemental secondary flag table; and program code, operative to merge the flag data in the complemental secondary flag table into the primary flag table.

16. The product as recited in claim 15, further comprising:

program code, operative to accept a second user request wherein a second subset of the documents are flagged by the user;

program code, operative to determine whether a number of flagged documents in the second subset exceeds a second threshold, the second threshold being lower than the first threshold;

program code, operative to create third document subset for the second user request, wherein the third document set is a document set containing the documents in the target document set which are flagged in the second user request; and program code responsive to exceeding the second threshold operative to create a secondary flag table for the third document subset and storing flag data for the third document subset in the secondary flag table.

17. The product as recited in claim 16, further comprising;

program code, operative to accept a third user request wherein a fourth subset of the documents are flagged by the user; and program code responsive to a number of flagged documents not exceeding the second threshold operative to update flag data in the primary flag table for flag data corresponding to the fourth document subset.

18. The apparatus as recited in claim 16, wherein flag data from secondary flag tables and complemental secondary flag tables are periodically merged into the primary flag table, wherein an order that the flag data from the secondary flag tables and complemental secondary flag tables is merged is based on order of creation of the secondary flag tables and complemental secondary flag tables.

19. The product as recited in claim 18, wherein the merging of the flag data from the secondary flag tables and complemental secondary flag tables is triggered when an amount of flag data in the secondary flag tables and complemental secondary flag tables is larger than a third threshold.

20. The apparatus as recited in claim 18, wherein the merging of the flag data from the secondary flag tables and complemental secondary flag tables is coordinated to occur concurrently with a garbage collection operation.

* * * * *